Oct. 31, 1950      P. N. RAWSON      2,528,244
VARIABLE-SPEED CONE TYPE TRANSMISSION

Filed July 1, 1948      2 Sheets-Sheet 1

PHILIP N. RAWSON
INVENTOR

BY Herbert J. Brown
ATTORNEY

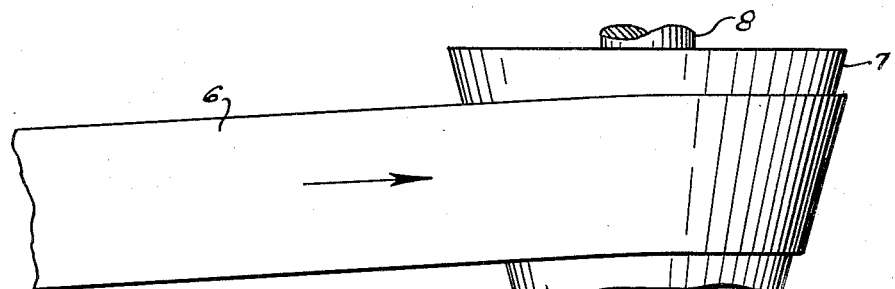
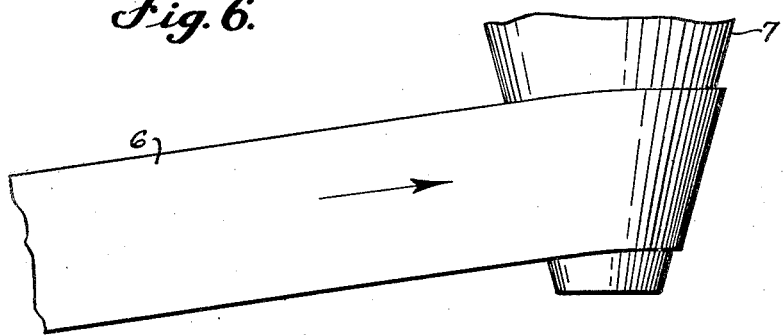

Patented Oct. 31, 1950

2,528,244

UNITED STATES PATENT OFFICE 2,528,244

VARIABLE-SPEED CONE TYPE TRANSMISSION

Philip N. Rawson, Fort Worth, Tex.

Application July 1, 1948, Serial No. 36,368

2 Claims. (Cl. 74—217)

1

This invention relates to variable speed driving mechanisms and has particular reference to a cone pulley arrangement for transmitting power from one pulley to another and for changing the relative speeds of the same.

Although cone type variable speed mechanisms have been known and used heretofore, such prior mechanisms required belt guides which created friction, and hence loss of power. Such prior constructions were also objectionable in that only one edge of the connecting belt was effective, and hence there was considerable loss in traction. On the other hand, when such belts were tightened there was a marked tendency of the belts to climb and further add friction or strain on the guides which were required to keep the belts in alignment. A further objection to former pulley transmissions was that the cones were gradually sloped so as to provide sufficient belt traction area on the pulleys, and hence only limited variable speed ratios between the respective pulleys were possible.

An object of the present invention is to provide a cone pulley transmission wherein belt guides are not required, and wherein the belt will operate on the desired cone diameter without climbing or otherwise running off of the cone.

Another object of the invention is to provide, in a cone pulley transmission, an arrangement and mechanism whereby the relative speeds of the driving and driven pulleys may be varied while in motion.

Another object of the invention is to provide a belt arrangement and a cone pulley transmission which will provide constant contact on the pulley surfaces, yet one which allows for change in circumferential length of the belt.

These and other objects of the invention will become apparent from the following description of the accompanying drawing, wherein:

Figure 6 is a broken enlarged plan view of a cone and belt and illustrating the angular relation between the same during operation at a fixed constant speed.

Figure 7 is a view similar to Figure 6 and showing the relative position of the belt when the driven pulley is operated at a relatively low speed.

Figure 8 is an elevational view of Figure 7.

Figure 9 is a broken plan view similar to Figure 7, but showing a serpentine belt of spring wire in place of the solid elastic belt illustrated in the foregoing figures.

Figure 10 is a plan view of a cone arrangement similar to the one shown in Figure 1, but showing both pulleys as being conical in form and having their tapers directed in substantially the same parallel direction.

Figure 1:
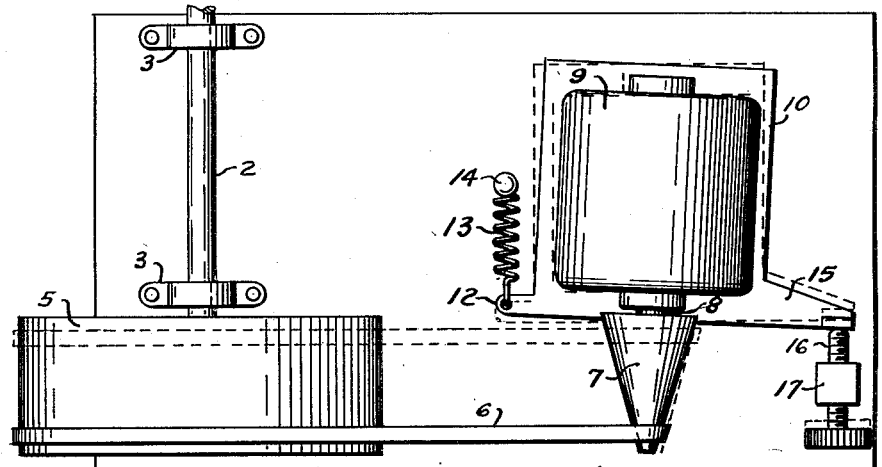
Figure 1 is a plan view of a motor and driven shaft connected by means of a cone and belt transmission embodying the features of the present invention.
Figure 2:
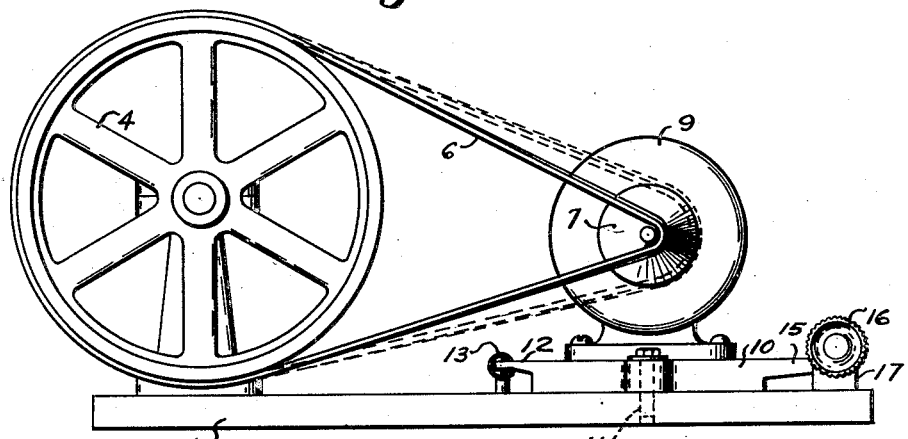
Figure 2 is an elevational view of Figure 1.

The form of the invention illustrated in Figures 1 and 2 includes a base 1 having a driven shaft 2 supported thereon by means of bearings 3. On one end of the shaft 2 there is a cylindrical pulley 4 having a wide face 5 upon which an endless elastic belt 6 is positioned, and which belt is also mounted on a driven pulley cone 7 secured to the shaft 8 of a motor 9. The pulleys 4 and 7 are arranged in substantially side by side parallel relation. The motor 9 is secured to a motor mount 10 which is flat and pivotally mounted on the base 1 by means of a bolt 11. The motor mount 10 is provided with an extending arm 12 at its inner side and has a tension spring 13 attached to its end, and which spring is secured at its remaining end to a projection 14 mounted in the base 1 and rearwardly located with respect to the cone 7. The side of the motor mount 10 opposite the projecting arm 12 is provided with another projecting arm 15 for coaction with a thumb screw 16 threadedly engaged in another projection 17 secured to the base 18 whereby the axis of the motor 9 may be angularly changed relative to the axis of the driven shaft 2.

Figure 3:
Figures 3, 4 and 5 are enlarged cross sectional views of different forms of elastic belts for carrying out the invention.
Figure 4:
Figure 5:

The elastic belt 6 may be made in many ways as exemplified in Figures 3, 4 and 5. As shown in Figure 3, the belt may be of one piece of elastic material, such as rubber, rectangular in cross-section, for ordinary use where the loads are relatively light.

The form of belt 6 illustrated in Figure 4 includes laminations of elastic material 6a, and an inner lamination 6b having a high friction coefficient, yet capable of being stretched along its edges. The last referred to material 6b may be of relatively soft rubber so as to provide sufficient traction between pulley 7 and belt. The form of invention illustrated in Figure 5 is similar to the one illustrated in Figure 4, but differs in that opposing faces of the belt are concave, as at 6c, whereby thick belts may be used without interfering with the separate expansion and contraction of the belt edges, as will be hereinafter more fully described.

The substantial equivalent of the described solid belt 6 is illustrated in Figure 9 in the form of a serpentine spring 18 having friction pads 19 bonded at each of the spring bends and along the opposite belt edges. The pads 19 are arranged to contact the surface of the pulleys 4 and 7. However, the spring form of belt 18 is not deemed to be practical for most purposes but is shown for illustrating the relative elongation along the one side of an elastic belt, such as 6, and the relative contraction along the other side of the said belt when in contact with the surface of the conical pulley 7. In operation, and before contacting the surface of the conical pulley 7, the pads 19 of the spring belt 18 are substantially equidistant from each other along the respective sides of the said belt, as indicated by the dimensions $a$ and $b$. Upon contacting the conical surface, the side of the belt near the large diameter of the conical pulley 7 stretches as indicated by the dimension $a'$, whereas the side of the belt 18 at the smaller diameter of the said conical pulley contracts, as indicated by the dimension $b'$. It is to be understood that the same relative dimensions referred to are applicable to all forms of the invention, and particularly apply to the solid elastic belt 6 illustrated in Figures 6 and 7. The unequal tension along each side of the belt 6 causes the latter to creep toward the large end of the pulley 7. The tendency to creep decreases as the diameter of the pulley increases, and accordingly, a state of equilibrium is reached. Particularly note Figure 6 wherein the length of the belt 6 is not perpendicular to the axis of the cone 7. By changing the position of the axis of the pulley 7, such as by manipulating the thumb screw 16 illustrated in Figure 1, the belt 6 may be caused to move either towards the large diameter or the small diameter of the cone 7.

The form of the invention shown in Figure 10 is substantially the same as the one illustrated in Figures 1 and 2, but differs in that the driven pulley 4a is conical and having its taper disposed in the same parallel direction as the driving pulley 7. The conical driven pulley 4a is supported on a shaft 2 and bearings 3 as previously described. By reason of the elasticity of the belt and the slight angular non-parallel disposition of the axes of the pulleys 4a and 7, and in view of the foregoing explanation, the belt 6 may be caused to engage the said pulleys without running off of either.

In view of the foregoing, it is apparent that the driven pulleys 4 and 4a need not be cylindrical, but that the operation, in view of the elastic belt 6 employed, depends upon the relative angular disposition of the axes of the driven and driving pulleys 4 and 7, or 4a and 7.

The described form of the invention is not restrictive but may be made in many ways within the scope of the appended claims.

What is claimed is:

1. A variable speed transmission comprising a driving pulley and a driven pulley in side by side relation, at least one of the said pulleys having a conical face, and an endless elastic belt connecting both of the said pulleys, and means for angularly changing the axis of one of the said pulleys relative to the axis of the other said pulley.

2. A variable speed transmission comprising a driven pulley having a cylindrical face, a driving pulley having a conical face, the said pulleys being arranged in side by side relation with respect to each other, an endless elastic belt connecting both of said pulleys, and means for angularly changing the axis of one of the said pulleys relative to the axis of the other of said pulley.

PHILIP N. RAWSON.

REFERENCES CITED

The following references are of record in the file of this patent:

UNITED STATES PATENTS

| Number | Name | Date |
|---|---|---|
| 577,574 | Dodge | Feb. 23, 1897 |
| 657,855 | Coleman | Sept. 11, 1900 |
| 2,092,241 | Brasseur | Sept. 7, 1937 |

FOREIGN PATENTS

| Number | Country | Date |
|---|---|---|
| 533,645 | Germany | Sept. 17, 1931 |
| 307,492 | Italy | May 5, 1933 |